US009566898B2

(12) United States Patent
Langkabel et al.

(10) Patent No.: US 9,566,898 B2
(45) Date of Patent: Feb. 14, 2017

(54) LIGHTING DEVICE OF A VEHICLE (71) Applicant: GM GLOBAL TECHNOLOGY OPERATIONS LLC, Detroit, MI (US)

(72) Inventors: Frank Langkabel, Ruesselsheim (DE); Philipp Roeckl, Aschaffenburg (DE); Ingolf Schneider, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 409 days.

(21) Appl. No.: 13/671,790

(22) Filed: Nov. 8, 2012

(65) Prior Publication Data
US 2013/0127341 A1    May 23, 2013

(30) Foreign Application Priority Data
Nov. 11, 2011    (DE) .................... 10 2011 118 332

(51) Int. Cl.
*B60Q 1/02* (2006.01)
*B60Q 1/08* (2006.01)
*F21S 8/10* (2006.01)

(52) U.S. Cl.
CPC ............. *B60Q 1/085* (2013.01); *F21S 48/115* (2013.01); *F21S 48/1131* (2013.01); *B60Q 2300/30* (2013.01); *B60Q 2300/40* (2013.01); *B60Q 2300/47* (2013.01)

(58) Field of Classification Search
CPC .................... H05B 33/0872; B60K 2310/262; B60Q 1/04; B60Q 2300/33
USPC ....................................... 315/77, 82
See application file for complete search history.

(56) References Cited

U.S. PATENT DOCUMENTS

| 6,406,172 B1 | 6/2002 | Harbers et al. |
| 7,288,900 B2* | 10/2007 | Biebl et al. ............... 315/291 |
| 8,538,636 B2* | 9/2013 | Breed .................. B60N 2/002 |
| | | 315/77 |
| 2003/0179586 A1 | 9/2003 | Pan |
| 2005/0128751 A1* | 6/2005 | Roberge et al. ........... 362/276 |
| 2007/0001822 A1* | 1/2007 | Haug ...................... 340/384.1 |
| 2008/0055896 A1 | 3/2008 | Feldmeier |

(Continued)

FOREIGN PATENT DOCUMENTS

| DE | 10207470 A1 | 12/2003 |
| DE | 102009010508 A1 | 10/2009 |

(Continued)

OTHER PUBLICATIONS

German Patent Office, German Search Report for Application No. 102011118332.2, dated Jun. 29, 2012.

*Primary Examiner* — Thuy Vinh Tran
(74) *Attorney, Agent, or Firm* — Lorenz & Kopf LLP (57) ABSTRACT A lighting device of a vehicle is provided. The lighting device comprises a light fitting, which comprises a first and a second light source with different color locations. Furthermore, the lighting device has a first sensing module, which senses the actual value of the color location of the light fitting. In addition, the lighting device comprises a set value generator module which presets a set value for the color location of the light fitting, and a control module which reduces the difference between set value and actual value by means of an actuator module. Here, the set value of the color location of the light fitting is dependent on a driving situation of the vehicle or a personalized driving setting.

15 Claims, 4 Drawing Sheets (56) References Cited

U.S. PATENT DOCUMENTS

| | | | |
|---|---|---|---|
| 2010/0235040 A1* | 9/2010 | Iwai | B60Q 1/085 |
| | | | 701/31.4 |
| 2010/0259175 A1 | 10/2010 | Forster et al. | |
| 2011/0175752 A1* | 7/2011 | Augst | 340/905 |
| 2012/0176234 A1* | 7/2012 | Taneyhill et al. | 340/453 |
| 2014/0063824 A1* | 3/2014 | Guan et al. | 362/464 |
| 2014/0125794 A1* | 5/2014 | Kanou et al. | 348/113 |

FOREIGN PATENT DOCUMENTS

| | | | |
|---|---|---|---|
| EP | 0772378 | A1 | 5/1997 |
| EP | 2408265 | A2 | 1/2012 |

\* cited by examiner

LIGHTING DEVICE OF A VEHICLE

CROSS-REFERENCE TO RELATED APPLICATION

This application claims priority to German Patent Application No. 10 2011 118 332.2, filed Nov. 11, 2011, which is incorporated herein by reference in its entirety.

TECHNICAL FIELD

The technical field relates to a lighting device of a vehicle. The lighting device comprises a light fitting having a first and a second light source with different color locations. Furthermore, the lighting device comprises a first sensing module, which senses the actual value of the color point of the light fitting. In addition, the lighting device comprises a set value generator module, which presets a set value for the color location of the light fitting and a control module, which reduces the difference between set value and actual value.

BACKGROUND

From the publication DE 10 2004 045 515 A1 a lighting system having at least two light sources and a method for operating such a lighting system are known. In the known lighting system there is at least one light source, a light-emitting diode that is operated by means of a driver device with a direct current signal. Furthermore, the lighting system includes a sensor device, which determines at least one feature of the light emitted by the lighting system, storing it as actual value. In addition, a set value presetting device is provided in the known lighting system, which presets a set value of a control device which approximates the actual value to the set value.

The known lighting system is designed in such a manner that the brightness can be varied however without a change of the color location which remains largely constant and neither interferences of the lighting operation nor high switching losses occurring. To this end, a method is stated for the known lighting system with which a color location shift, which can occur during the dimming of light sources and simultaneously changes the wave length and thus the color of the emitted light is prevented.

In this connection, color location in a standard valiancy system is to mean a color as a sum of three composite values of a color triangle, the so-called standard color values X, Y and Z or red, yellow and blue. In such a color triangle with color locations, warm-yellow regions and cold-blue regions materialize in addition to red regions. An optical mixture between warm-yellow regions and cold-blue regions produces a daylight-similar cold-white lighting.

While in the known prior art the lighting system is controlled with at least two light sources in such a manner that the color location of a light fitting remains largely constant, it may be desirable to create a lighting device of a vehicle having at least one light fitting, whose color location does not remain constant but is largely variable. In addition, other objects, desirable features and characteristics will become apparent from the subsequent summary and detailed description, and the appended claims, taken in conjunction with the accompanying drawings and this background.

SUMMARY

According to an exemplary embodiment of the present disclosure, a lighting device of a vehicle is disclosed. The lighting device comprises a light fitting having a first and a second light source with different color locations. Furthermore, the lighting device has a first sensing module which senses the actual value of the color location of the light fitting. In addition, the lighting device comprises a set value generator module which presets a set value for the color location of the light fitting and a control module which reduces the difference between set value and actual value by means of an actuator module. Here, the set value of the color location of the light fitting is dependent on a driving situation of the vehicle or a personalized driving setting.

This lighting device has the advantage that the light color can be specifically changed within the scope of the requirements by the legislator from a yellowish, pleasant color tone, such as is already realized today in full LED headlamps to a color tone shifted into the daylight-similar white. This change can be automatically adjusted advantageously as a function of the respective driving situation, traffic situation or daytime or selectable in an automatic or personalized manner.

Many of the following functional units which are described in this specification are described as modules. Modules can include hardware switching circuits having one or a plurality of processes with memory, maximum-integration switching circuits (VLSI), gate arrays, programmable logic and/or discreet components. The hardware circuits can carry out logic functions, carry out computer-readable programs which are stored on tangible storage units and/or carry out programmed functions. Modules can also include a computer-readable storage medium, which comprises a computer-readable program which is stored on a tangible storage device which carries out a function when it is carried out by a hardware circuit such as a processor, microprocessor or the like.

In another exemplary embodiment of the present disclosure it is provided that the personalized driving settings are arbitrarily presettable by a vehicle driver via a color location selector module as set values within the scope of the limits to be maintained by the law. Thus there is advantageously the possibility for the driver to shift the color location of the light fitting more into the cold-white region during nighttime driving outside built-up areas in order to achieve an improved illumination of the road. Within built-up areas with street lightings it can be advantageous to arbitrarily set the color location of the light fitting back into a warm-yellow range. During daylight driving, it is additionally possible for the driver to select a daylight-similar cold-white range which is obtained from mixing a color location in the cold-blue range and warm-yellow range.

It is furthermore provided according to the various teachings of the present disclosure that the set value generator module interacts with a second sensing module which automatically senses the driving situation, wherein available navigation information of a navigation module, traffic routing information and car-to-car traffic information of a traffic information module, distance information of a distance module or travelling speed information of a travelling speed module can be sensed. Thus it includes the advantage that by interacting with the navigation module different color locations of the light fitting can be preset as set value for driving within built-up areas and outside built-up areas taking into account the daytime or nighttime situations.

With the traffic information module, the light fitting can automatically react to different warning and prohibition signs which can be sensed via the traffic routing information. In addition, car-to-car traffic information can be reacted to, wherein for example on approaching a congestion, the color location of the light fitting can be automatically shifted in the direction of a cold-blue range or in the direction of a cold-white daylight-similar range. Similarly, the shifting of the color location can include distance information via the distance module, wherein with increasing shortening of the distance the set value of the color location can be shifted in the direction of the cold-blue range. Similarly, the set value for the driving speed module can be automatically changed from a warm-yellow range with adapted customary local speed to a cold-blue or daylight-similar cold-white range when travelling on a freeway or outside built-up areas.

In another exemplary embodiment of the present disclosure, the respective actual value of the color location can be sensed by means of available data of the actuator module via adjustment options of the color location. To this end, a feedback between actuator module and light source sensing module is provided, so that the current actual value, which is obtained from the adjustment options of the actuator, is made available for the actual value module to the input of the control module, wherein at the input of the control module the set value of the set value generator module is simultaneously present.

Here, the adjustment options of the actuator can comprise a variation of a supply current of the light sources by means of a pulse width modulation module or a possibility of employing color combinations of color filters of a color filter module. In addition to this it is possible to have a color location shift carried out by the actuator module by means of rotary angle adjustments of polarization filters of a polarization filter module, wherein the adjustment options of the polarization filters can be fed back to the actual value sensing module for an actual value sensing.

In another exemplary embodiment of the present disclosure it is provided that the lighting device as first light source comprises a first light-emitting diode with a dominant color location in a warm-yellow range and as second light source a second light-emitting diode with a dominant color location in a cold-blue range. Here, a control of the light intensity of the light-emitting first and second light-emitting diode makes possible a shift of the common color location of the light fitting. Such a lighting device has the advantage that as light sources it comprises light-emitting diodes with different dominant color location yet is able to form a full headlamp which can reproduce both the light impression of a conventional halogen headlamp as well as the significantly more dazzling light impression of a Xenon headlamp.

This is achieved through superimposition of at least two light-emitting diodes with different dominant color tone in that in this exemplary embodiment of the present disclosure the use of yellow and blue light-emitting diodes under complete superimposition leads to a warm-white light or in that by increasing the blue component through a pulse width-modulated dimming of the yellow light-emitting diode an increased blue component in the direction of cold-white light appears on the road.

In addition to the displacing of the color location and thus of the working point of a yellow light-emitting diode, the working point of a cold-blue light-emitting diode can also be shifted in order to achieve an increase of the blue component and of the illumination on the road. To this end, the actuator module comprises a pulse width modulation module which is designed for shifting a color location to a cold-blue color location of a light fitting, while a dimming of the first light-emitting diode with the dominant warm-yellow color location is carried out.

The actuator module cannot only carry out an enlarged current pulse width for the first light-emitting diode with the dominant color location in the warm-yellow range, but also provide for the second light-emitting diode with the color location in the cold-blue range for shifting in the direction of the cold-blue range subject to forming a cold-white dominant common color location of the light fitting corresponding to the daylight.

As already briefly mentioned above, the actuator module can comprise a polarization filter module having at least two polarization filters which can be rotated against each other and dependent on a rotary angle difference between about 0° and about 90°, controls the radiation intensity of about 100% to about zero. Here, a color location shift in the direction of a more short-wave cold-blue color location can occur because of a weakening of the more long-wave warm-yellow color component with increasing rotary angle difference when a further polarization filter is additionally arranged in the polarization filter module.

In addition to this it is also provided that the light fitting comprises a plurality of monochromatic LED's, whose superimpositions can form a preset set value color location depending on driving situation or personalized driving adjustments. Here, so-called RGB-light emitting diodes (red-yellow-blue LED's) can contribute to the specific adjustment of the color location. Here, the principle of these light-emitting diodes follows the principle of the additive color mixing, wherein the superimposition of a plurality of monochromatic light-emitting diodes produces the desired color location.

Another one of various aspects of the present disclosure relates to a vehicle which comprises a lighting device as described above as full headlamp. The full headlamp comprises at least one light fitting having a first and a second light source with different color locations. Furthermore, a first sensing module is provided in the lighting device which senses the actual value of the color location of the light fitting. Furthermore, a set value for the color location of the light fitting is preset with a set value generator module and a control module reduces the difference between set value and actual value via an actuator module. Here, the set value of the color location of the light fitting is dependent on a driving situation of the vehicle or of a personalized driving setting.

In addition to a first sensing module for the actual value of the color location of the two light sources, the vehicle furthermore comprises a second sensing module which is designed for sensing at least one parameter characterizing a current traffic situation by means of available navigation information, traffic routing information, car-to-car traffic information, distance information or travelling speed information. To this end, the second sensing module comprises a module selected from the group comprising a navigation module, a traffic information module, a distance module or a travelling speed module. In this connection, the traffic information module comprises a camera with an evaluation unit and a car-to-car communication interface. The distance module comprises at least one lidar sensor or at least one radar sensor or at least one ultrasound sensor with evaluation unit.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
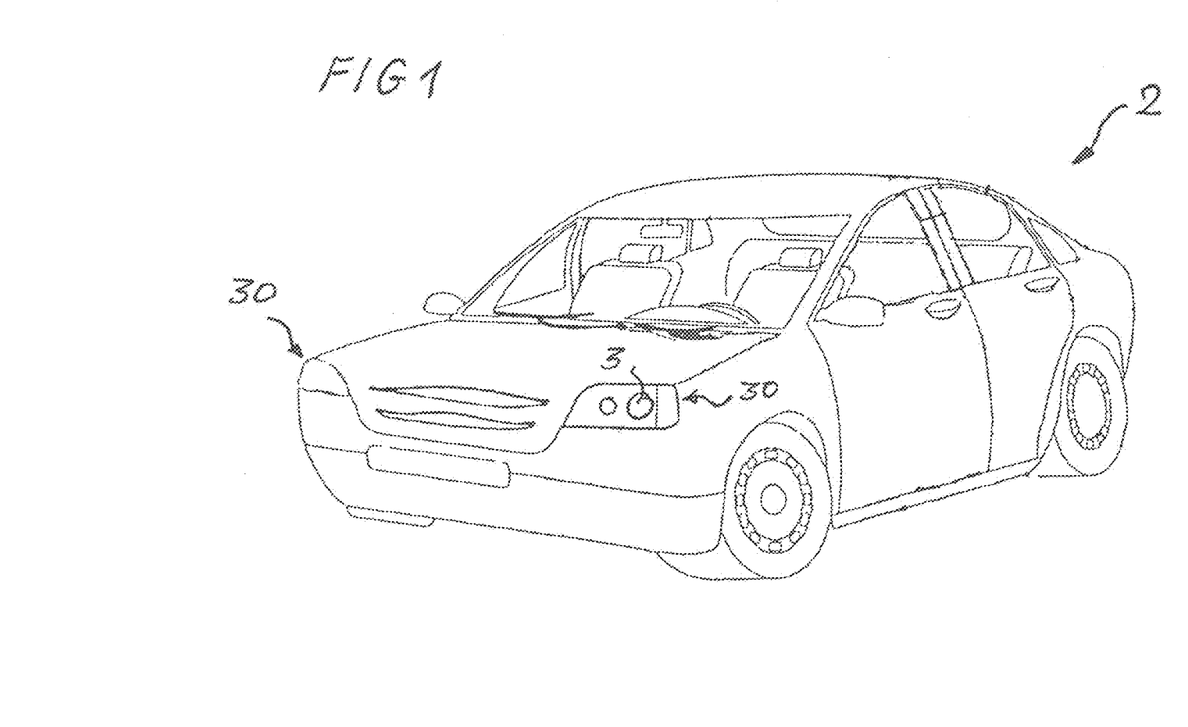
FIG. 1 shows a schematic perspective view of a vehicle with lighting device according to an exemplary embodiment of the present disclosure.

FIG. 1 shows a schematic perspective view of a vehicle 2 with a lighting device, which forms full headlamps 30 of the vehicle 2, wherein each headlamp 30 comprises at least one light fitting 3 having a headlight that can be shifted in its color location, wherein the shift is initiated by a set value generator module and carried out by an actuator module.

Figure 2:
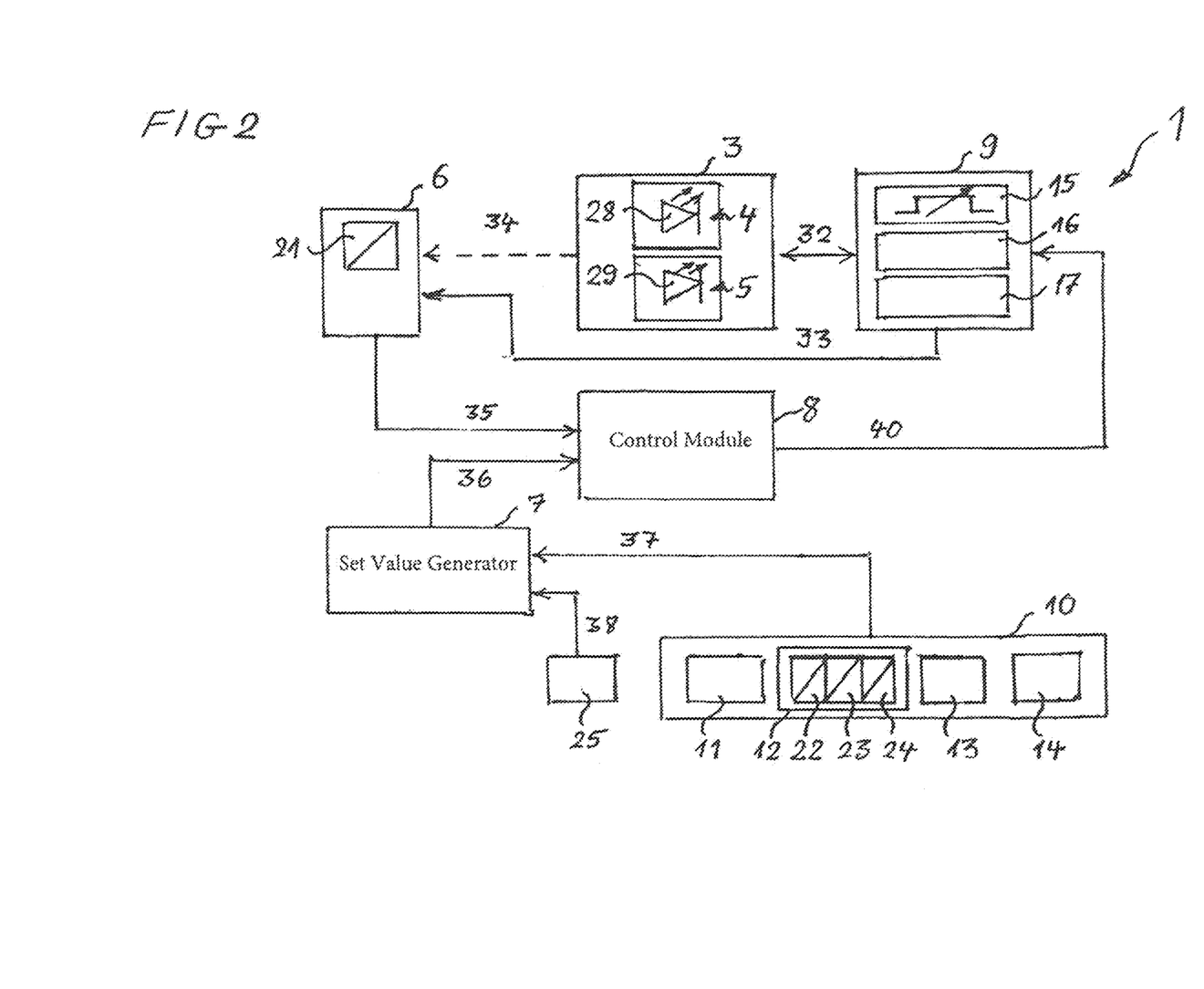
FIG. 2 shows a block diagram of the lighting device employed in the vehicle according to FIG. 1.

To this end, the following FIG. 2 shows a block diagram of the lighting device 1 employed in the vehicle 2 according to FIG. 1. The lighting device 1 comprises the light fitting 3, the color location of which can be shifted within the scope of the legally preset limits between a warm-yellow range up to a cold-blue range in that at least one first light-emitting diode 28 with a dominant color location in a warm-yellow range and a second light-emitting diode 29 with a dominant color location in a cold-blue range is provided, which can also serve as first and second light source 4 and 5 of a full headlamp. These light sources 4 and 5 in the light fitting 3 are controlled by the actuator module 9 via a control line 32.

The actuator module 9 has different adjustment options and to this end can comprise a pulse width modulation module 15, a color filter module 16 or a polarization filter module 17. A current adjustment of the actuator module 9 interacts with the light sources 4 and 5 via the control line 32. This current adjustment is additionally fed back via a feedback signal line 33 to a first sensing module 6 for sensing an actual value. The first sensing module 6 supplies the current adjustment values of the actuator 9 as actual values to an input of a control module 8 via the actual value signal line 35.

Instead of the feedback of the adjustment options of the actuator module 9 via the feedback signal line 33, a feedback can also take place via a fiber-optical light wave guide 34 between the light fitting 3 and the first sensing module 6. The sensing module 6 to this end comprises a suitable color location sensor 21 which interacts with the light wave guide 34 and senses the actual value of the color location. The actual value sensed by the sensor 21 is placed at the input of the control module 8 via the actual value signal line 35.

In addition, a set value is additionally connected to the input of the control module 8 via the set value signal line 36 of the set value generator module 7, which presets a set value to be adjusted for the color location of the light fitting 3. The control module 8 is designed in order to reduce the difference between set value and actual value in interaction with the actuator module via the signal line 40.

In addition to the first sensing module 6 for the actual value, a second sensing module 10 for the set value is provided in the lighting device 1, which automatically senses a driving situation, feeding it to the set value generator module via a set value signal line 37. In addition to the sensing module 10, which automatically senses a driving situation, the set value generator module 7 can also be preset a set value by a color location selector module 25 via the set value signal line 38. The color location selector module 25 is provided for inputting a set value of a personalized driving setting.

For presetting a set value of an automatically determined driving situation via the set value signal line 37, a plurality of information sources can be available to the second sensing module 10. In the exemplary embodiment of the present disclosure shown in the block diagram it is provided that the second sensing module 10 for presetting a set value for a color location, comprises a traffic information module 11. The traffic information module 11 for sensing traffic routing information can comprise a camera which is not shown and an evaluation unit. Furthermore, the traffic information module 11 can contain traffic information regarding a car-to-car communication interface, so that the set value of the color location as described above can be adapted to the respective traffic and driving situation.

The second sensing module 10 for the automatic presetting of a set value of a color location via the set value signal line 37 to the set value generator module 7 can comprise a distance module 12, which comprises at least one lidar sensor 22 or a radar sensor 23 or an ultrasound sensor 24. The distance module 12 can change the set value for the color location as described above in the manner that upon adequate distance between the vehicles the lighting device with the light fitting 3 has a dominant color location in the warm-yellow range and with increasing shortening of the distance shifts the set value for the color location into the cold-blue range.

Similarly, the second sensing module 10 can interact with a travelling speed module 13 and via the set value signal line 37 transmit a set value to the set value generator module 7, which with increasing travelling speed varies the set value of the color location from a warm-yellow range to a cold-blue range.

Furthermore, the second sensing module 10 can interact with a navigation module 14 and preset a set value to the set value generator module 7 via the set value signal line 37, wherein the set value for the color location can be independent of the traffic within built-up areas and outside built-up areas. Usually, roads outside built-up areas are not illuminated, which is why a color location is automatically preset in the cold-white daylight-like range as set value. Within built-up areas, which usually comprise illuminated streets, a set value of the color location in a warm-yellow range can dominant as color tone of the light fitting 3. Such a color location can be automatically preset as a function of a navigation module 14 as set value via the set value signal line 37 to the set value generator module 7.

Figure 3:
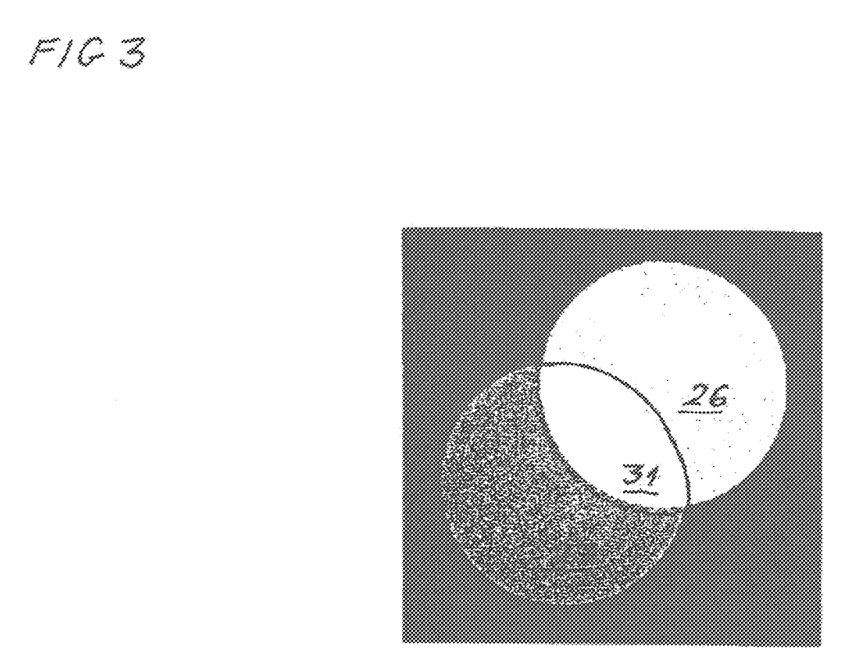
FIG. 3 shows a schematic representation of an additive overlapping of two color rays.

FIG. 3 shows a schematic representation of an additive overlap of two color rays, wherein a first color ray covers a warm-yellow range 26 and a second color ray has a cold-blue range 37. In the overlap region of the two ray depictions a cold-white dominant color location 31 is obtained, which corresponds to a radiation of the daylight. FIG. 3 thus shows the variation possibilities of a color location of two light-emitting diodes, wherein a first light-emitting diode 28, as is shown in FIG. 2, can cover the warm-yellow range and a second light-emitting diode 29, as is shown in FIG. 2, illuminates the cold-blue range. With the complete overlap of the two ray depictions through color addition which is not shown, a cold-white dominant color location 31 for the light of such a light fitting is achieved.

Figures 4, 4A:
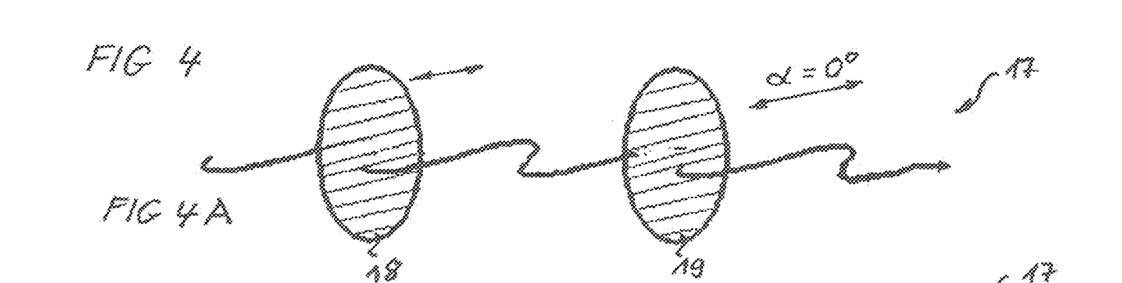
FIG. 4 shows with FIGS. 4A, 4B and 4C the effects of polarization filters that can be rotated against one another.
Figure 4B:
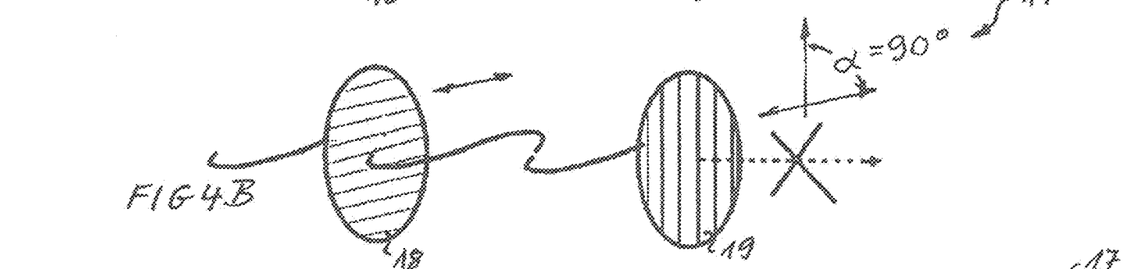

FIG. 4 shows a further possibility of adjustment options of an actuator module with the help of a polarization filter module 17. In FIG. 4A, two polarization filters 18 and 19 that can be rotated against each other are schematically shown, which have a rotary angle of about 0° against each other, so that light polarized in the polarization filter 18 can radiate undiminished through the polarization filter 19. FIG. 4B shows the case when the two polarization filters 18 and 19 are rotated by about 90° against each other, so that a complete extinguishment of the light takes place. With rotary angles between about 0° and about 90°, a dimming of a light source can thus be achieved.

Figure 4C:
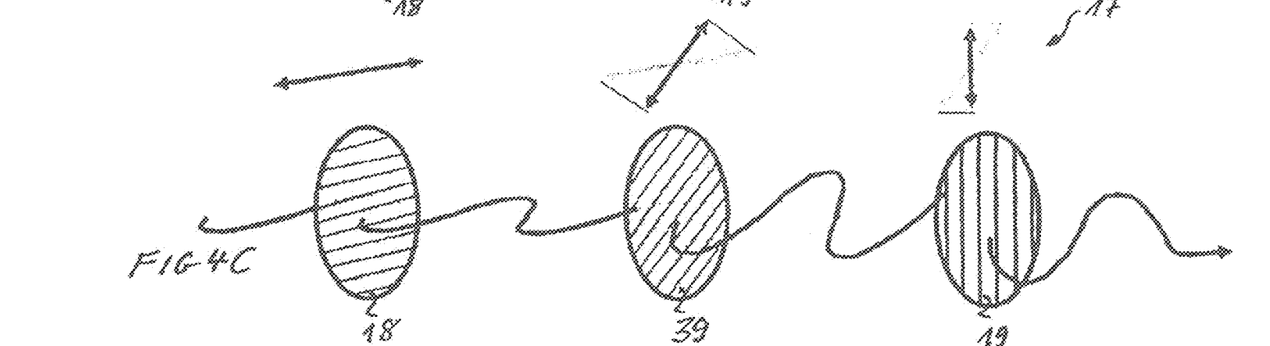

FIG. 4C by contrast shows an adjustment option, wherein between the two polarization filters 18 and 19 rotated by about 90° a further polarization filter 39 is arranged which has a rotary angle that causes a partial absorption of the light subject to the diminishing of the yellow color component and because of this increases the blue spectral component in the ratio.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A lighting device of a vehicle, comprising:
    a light fitting having a first and a second light source, wherein the first light source emits light having a first dominant color location and the second light source emits light having a second dominant color location that is different from the first dominant color location, the first dominant and second dominant color locations being in a spectrum of visible light;
    a first sensing module that senses an actual value of a color location of the light fitting, wherein the actual value of the color location of the light fitting is the color location of light emitted by the light fitting;
    a set value generator module that sets a set value for the color location of the light fitting, wherein the set value generator module interacts with a second sensing module which senses a driving situation based on navigation information of a navigation module, traffic routing information, car-to-car traffic information of a traffic information module, travelling speed information of a travelling speed module, or combinations thereof;
    a control module in communication with the first sensing module and the set value generator module that reduces the difference between the set value and the actual value; and
    an actuator module in communication with the control module that controls the light fitting, the actuator module providing the first sensing module with feedback via a feedback signal line for sensing the actual value,
    wherein the set value of the color location of the light fitting is dependent on the driving situation of the vehicle or a personalized driving setting.

2. The lighting device according to claim 1, wherein the personalized driving settings is set via a color location selector module by a vehicle driver as the set value, wherein the color location selector module limits the set value to a color location that is within a range defined by legal limits.

3. The lighting device according to claim 1, wherein the actuator module includes a pulse width modulation module for vaying a supply current of the first and second light sources.

4. The lighting device according to claim 3, wherein the first light source comprises a first light-emitting diode with a dominant color location in a warm-yellow range and the second light source comprises a second light-emitting diode with a dominant color location in a cold-blue range, and wherein the first and second light-emitting diodes are configured to emit a variable light intensity to make possible a shifting of the common color location of a light emitted by the light fitting.

5. The lighting device according to claim 4, wherein the actuator module further comprises the pulse width modulation module that shifts a color location to a cold-blue color location of the light fitting to carry out a dimming of at least the first light-emitting diode with a dominant warm-yellow color location.

6. The lighting device according to claim 4, wherein the actuator module comprises a polarization filter module that includes at least two polarization filters which are rotatable against one another, wherein the polarization filter module is configured to rotate the at least two polarization filters to control the radiation intensity from about 100% to about zero dependent on a rotary angle difference between about 0° and about 90°, wherein a color location shift in the direction of a more short-wave, cold-blue color location occurs because of a diminishing of the more long-wave warm-yellow color component with increasing rotary angle difference.

7. The lighting device according to claim 3, wherein the pulse width modulation module is configured to cause the light fitting to emit a light having a cold-white dominant color location corresponding to the daylight by adjusting a pulse width modulated current provided to the first light source with the dominant color location in the warm-yellow range as well as to the second light source with the color location in the cold-blue range.

8. The lighting device according to claim 1, further comprising a color filter module having color filters.

9. The lighting device according to claim 1, further comprising a polarization filter module having polarization filters.

10. The lighting device according to claim 1, wherein each of the first and second light sources comprises a plurality of monochromatic LED's, the superimpositions of light emitted from which form a preset color location value.

11. A vehicle, comprising:
    a lighting device as a headlamp, the lighting device including:
    a light fitting having a first and second light source, wherein the first light source emits light having a first dominant color location and the second light source emits light having a second dominant color location that different from the first dominant color location, the first dominant and second dominant color locations being in a spectrum of visible light;
    a first sensing module that senses an actual value of a color location of the light fitting, wherein the actual value of the color location of the light fitting is the color location of light emitted by the light fitting;

a set value generator module that sets a set value for the color location of the light fitting, wherein the set value generator module interacts with a second sensing module which senses a driving situation based on navigation information of a navigation module, traffic routing information, car-to-car traffic information of a traffic information module, travelling speed information of a travelling speed module, or combinations thereof; and a control module in communication with the first sensing module and the set value generator module that reduces the difference between the set value and the actual value; and an actuator module in communication with the control module that controls the light fitting, the actuator module providing the first sensing module with feedback via a feedback signal line for sensing the actual value, wherein the set value of the color location of the light fitting is dependent on a driving situation of the vehicle or a personalized driving setting.

12. The vehicle according to claim 11, wherein the vehicle further comprises a second sensing module that senses at least one parameter characterizing a current traffic situation based on navigation information, traffic routing information, car-to-car traffic information, distance information or travelling speed information.

13. The vehicle according to claim 12, wherein the second sensing module comprises a module selected from the group comprising a navigation module, a traffic information module, a distance module, a travelling speed module and combinations thereof.

14. The vehicle according to claim 13, wherein the traffic information module comprises a camera with an evaluation unit and a car-to-car communication interface.

15. The vehicle according to claim 13, wherein the distance module comprises at least one lidar sensor, at least one radar sensor or at least one ultrasound sensor with evaluation unit.

* * * * *